United States Patent [19]

Hashimoto et al.

[11] Patent Number: 4,500,913
[45] Date of Patent: Feb. 19, 1985

[54] SOLID-STATE COLOR IMAGE SENSING DEVICE

[75] Inventors: Seiji Hashimoto; Nobuyoshi Tanaka, both of Kanagawa; Akira Suga, Tokyo; Tetsuro Kuwayama, Kanagawa, all of Japan

[73] Assignee: Canon Kabushiki Kaisha, Tokyo, Japan

[21] Appl. No.: 386,232

[22] Filed: Jun. 8, 1982

[30] Foreign Application Priority Data

Jun. 18, 1981 [JP] Japan .................................. 56-93019

[51] Int. Cl.³ .............................................. H04N 9/07
[52] U.S. Cl. .................................................... 358/44
[58] Field of Search ................................ 358/44, 43, 47

[56] References Cited
U.S. PATENT DOCUMENTS
4,437,112 3/1984 Tanaka et al. ......................... 358/44

Primary Examiner—Richard Murray
Attorney, Agent, or Firm—Toren, McGeady and Stanger

[57] ABSTRACT

The disclosed solid-state color image sensing device has a color mosaic filter adapted to correspond to each of the picture elements of a solid-state image sensing element and is arranged to obtain a color signal from a difference signal corresponding to a difference between the direct output signal of the solid-state image sensing element and another output signal obtained through one preceding horizontal scanning period. The device provides a signal producing circuit which produces an inversion control signal arranged to control the periodic inversion of the difference signal determined by the color arrangement of the color mosaic filter and an inversion processing circuit which uniformalizes the polarity of a predetermined color signal in response to the inversion control signal. The above stated color signal is obtained from the low frequency zone component of the output signal of the inversion processing circuit.

17 Claims, 20 Drawing Figures

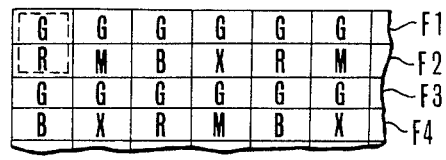
FIG.1
PRIOR ART
FIG.2
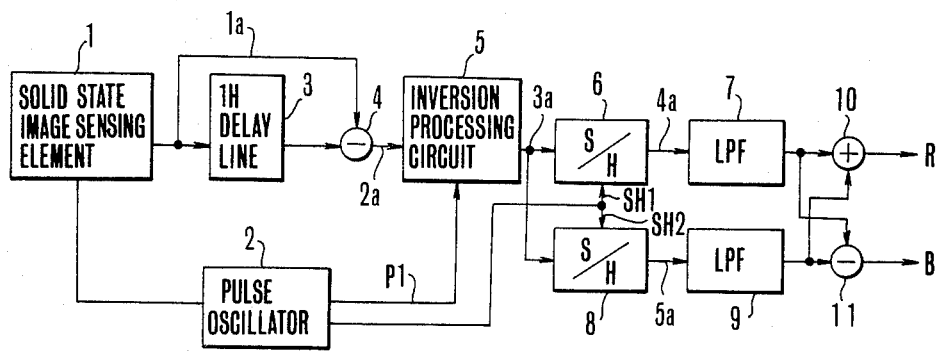
FIG.3a 0H
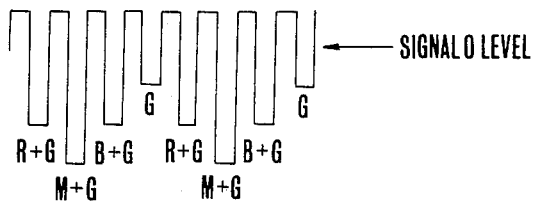
← SIGNAL 0 LEVEL
FIG.3b 1H
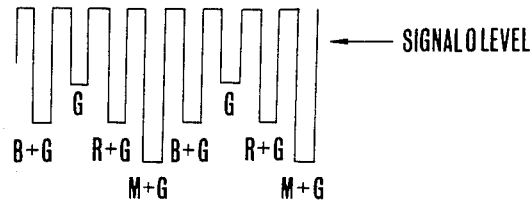
← SIGNAL 0 LEVEL
FIG.3c 2H
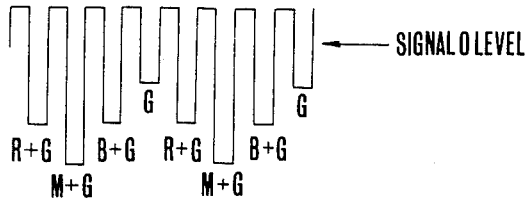
← SIGNAL 0 LEVEL

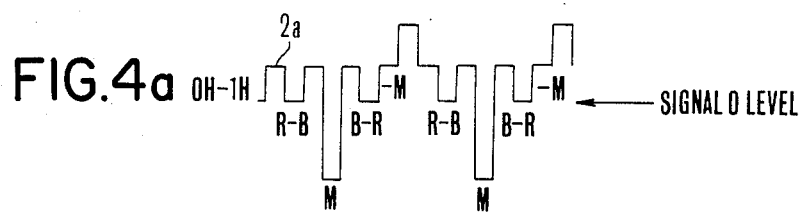
FIG.4a
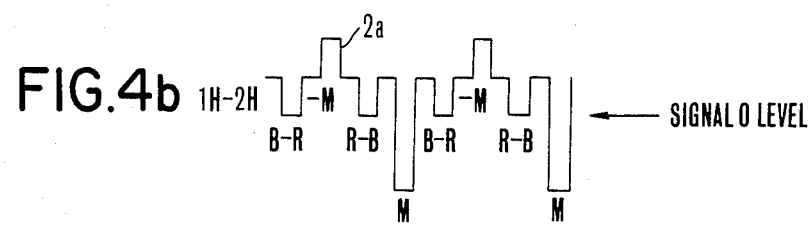
FIG.4b
FIG.4c P1
FIG.4d P1
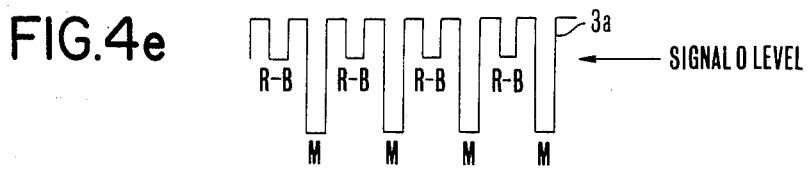
FIG.4e
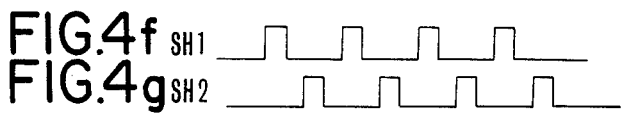
FIG.4f SH1
FIG.4g SH2
FIG.4h
FIG.4i
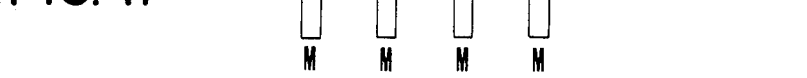

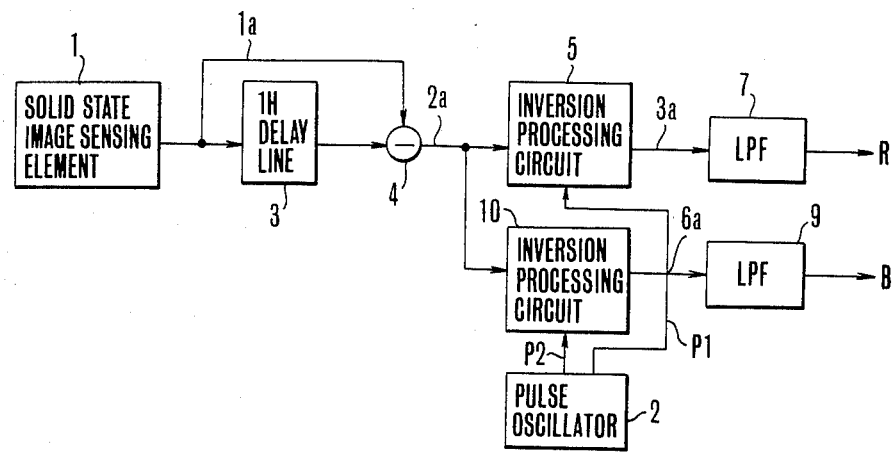

SOLID-STATE COLOR IMAGE SENSING DEVICE

BACKGROUND OF THE INVENTION

1. Field of the Invention

This invention relates to a solid-state color image sensing device and more particularly to a solid-state color image sensing device which has a color mosaic filter adapted to correspond to each of the picture elements of a solid-state image sensing element.

2. Description of the Prior Art

Conventional solid-state color image sensing devices of this type employ a method of obtaining a primary color signal output from a multiplexed color signal from a plurality of picture elements, say, two picture elements. A conventional solid-state color image sensing device is provided with a color mosaic filter which is arranged, for example, as shown in FIG. 1 of the accompanying drawings, and is stuck to a frame transfer type CCD in such a way as to correspond to each picture element of the image pickup part thereof. Referring to FIG. 1, the mosaic filter includes green filter parts G, red filter parts R, blue filter parts B, magenta filter parts M (M=R+B) and light shielding parts X. The first row F1 of the filter parts consists entirely of the green filter parts G; the second row F2 consists of R, M, B and X repeatedly arranged; the third row F3 entirely consists of G; and the fourth row F4 consists of B, X, R and M repeatedly arranged. In this instance, the sum of the outputs of two picture elements in the first and second rows located in the same column in the vertical direction is taken as the output of one cell of a solid-state image sensing element (hereinafter called CCD) as shown in FIG. 2 and is read out one after another in the horizontal direction.

Accordingly, a color output signal is obtained through a zero horizontal scanning period OH of the CCD 1 as shown in FIG. 3(a). Output signals to be obtained through first and second horizontal scanning periods 1H and 2H are shown in FIGS. 3(b) and 3(c). In this instance, the signal of the CCD 1 is generally produced in the form of a pulse amplitude modulated (PAM) output. However, to facilitate understanding, only the signal portion of the output of the CCD 1 is taken into consideration herein.

The output of the CCD 1 is supplied directly to a subtractor 4 via signal line 1a and also to the subtractor 4 through a 1H delay line 3 which is arranged to delay the signal by one horizontal scanning period. With this arrangement employed, a color difference signal 2a of (0H−1H) and (1H−2H), i.e. a correlated signal relative to adjacent horizontal lines, is obtained at every horizontal scanning period as shown in FIGS. 4(a) and 4(b).

However, the color difference signal 2a has the polarity of its combination of R−B and M (or M and B−R) periodically inverted as shown in the drawing. To solve this problem, use of an inversion processing circuit 5 has been contemplated for carrying out an inversive process. A pulse oscillator 2 which produces an inversion control signal P1 is connected to the inversion processing circuit 5 as shown in FIGS. 4(c) and 4(d). With this arrangement used, an inversion control signal as shown in FIG. 4(c) is produced for (0H−1H) of the color difference signal 2a and another inversion control signal as shown in FIG 4(d) is produced for (1H−2H) of the color difference signal 2a. Then a color difference signal 3a which has the polarity made uniform for R−B and M is obtained at the output terminal 3a of the inversion processing circuit 5 as shown in FIG. 4(e). The color difference signal 3a then has its respective R−B and M portions sample held respectively by sample hold circuits 6 and 8 under the control of sample pulses SH1 and SH2 shown in FIGS. 4(f) and 4(g). This arrangement gives sample hold outputs 4a and 5a as shown in FIGS. 4(h) and 4(i). The signals 4a and 5a are guided to a low pass filters (LPF) 7 and 9 to remove unnecessary higher harmonic component. After that, color signals R and B are obtained through an adder 10 and a subtracter 11 which are arranged subsequent to the low pass filters 7 and 9.

This signal processing method, as described above, produces normal color signals by correcting the periodic polarities of the color difference signals determined by the color arrangement of the color mosaic filter. However, in inverting the polarity as described above, the (R−B) and M of the color difference signal are processed to be of inform polarity; then the signal is divided into color difference signals (R−B) and M; and then the color signals R and B are obtained through adding and subtracting operations. The conventional arrangement thus necessitates use of two channels of sample hold circuits. Further, since the signals to be handled are at least several MHz, it requires use of parts adapted for high speed operation. Besides, in accordance with the conventional method, much time is required for timing adjustment work on the sample hold circuits.

SUMMARY OF THE INVENTION

It is an object of the present invention to provide a solid-state color image sensing device which is capable of obviating the above stated shortcomings of the prior art.

It is another object of the invention to provide a solid-state color image sensing device or a method in which desired color signals can be obtained with simple structural arrangement from signals of inverted polarity produced through a correlating process such as a vertical correlation process.

According to an embodiment of the invention, in a device for converting an image obtained via a plurality of mosaic color filters by an image sensing or pick-up means such as a CCD, an image pickup tube or the like into a time seriated signal, while the correlating process between predetermined picture elements is carried out by means of the time seriated output of the image pickup means, the polarity of a signal produced through the correlating process is inverted in predetermined synchronism and, after that, only desired color signals are extracted from the signal by removing a high frequency zone component of the signal.

Therefore, unlike the conventional arrangement, the invention obviates the necessity of use of a plurality of sample hold circuits to permit simplification of structural arrangement and to facilitate adjustment work.

Further, in the embodiment of the invention, the arrangement of the conventional device using an adder and an extractor is replaced with an arrangement allowing the time seriated signal to pass through a low pass filter after control over the polarity of some signal components of the time seriated signal has been accomplished. This results in an extremely simplified circuit arrangement and yet gives the same effects as the conventional arrangement.

These objects, features and advantages of the invention will become apparent from the following detailed description of a preferred embodiment thereof taken in connection with the accompanying drawings.

BRIEF DESCRIPTION OF THE DRAWINGS

FIG. 1 illustrates the general arrangement of a color mosaic filter.

FIG. 2 is a block diagram schematically showing the conventional signal processing circuit.

FIGS. 3(a)-(c) and 4(a)-(i) are signal wave form charts showing the operation of the circuit shown in FIG. 2.

FIG. 5 is a block diagram showing a circuit of a solid-state color image sensing device adapted for signal processing as an embodiment of the present invention.

FIG. 6(a)-6(e) are signal waveform charts showing the operation of the circuit shown in FIG. 5.

DETAILED DESCRIPTION OF PREFERRED EMBODIMENT

Referring to FIG. 5 which shows an embodiment of the present invention, the parts of the embodiment that are identical with those shown in FIG. 2 are indicated by the same reference numerals as those used in FIG. 2. The embodiment includes an inversion processing circuit 10 arranged to uniformalize the polarity of a color signal of B which is one component of a color difference signal 2a; and a low pass filter 9 which allows only a low zone component of the output signal 6a of the inversion processing circuit 10 required as color signal to pass therethrough.

In this embodiment of the invention, a first signal ±(R−B) and a second signal ±M which form the color difference signal 2a (see FIGS. 4(a) and 4(b)) are processed to uniformalize the polarity of only the primary color R or B. After that, the signals R and B are obtained by allowing these first and second signals to pass through the low pass filter as they are.

In this embodiment of the invention, the inversion processing circuit 5 and the low pass filter 7 operate in the same manner as in the conventional device. Referring to FIG. 4(e), in the output signal 3a of the inversion processing circuit 5, the signal component obtained during one horizontal scanning period consists of R−B and M (M=R+B). If attention is limited to the color signal of R, the color signal R is always of plus polarity. Next, if attention is limited to the color signal of B, the polarity thereof is inverted at every bit. The level of the signal B becomes almost zero when it is passed through the low pass filter. Generally, the transfer pulses of a solid-state image sensing element are 7.16 MHz. Therefore, the signal B is modulated at 3.58 MHz. The band of the color signals R and B required for obtaining an NTSC signal is 500 KHz and the signal B is rendered almost zero by integration of adjacent signals of + and −.

In this manner, passing through the low pass filter permits obtaining the R component only. Referring now to FIGS. 6(a) and (b), based on the same concept, the polarity of the B component is uniformalized with the inversion control pulses P2 which are shown in FIGS. 6(c) and 6(d) and are produced from the pulse oscillator 2 through the inversion processing circuit 10 applied to color difference signals 2a which are as shown in FIGS. 6(a) and 6(b). Further, in this instance, the color difference signals 2a are inverted at every horizontal scanning period as shown in FIGS. 6(a) and 6(b). Accordingly, the inversion control pulses P2 are arranged to be inverted at every horizontal scanning period as shown in FIGS. 6(c) and 6(d).

With the polarity of the B component uniformalized in this manner, a signal 6a is obtained as shown in FIG. 6(e). The signal 6a is allowed to pass through the low pass filter 9 to give only the color signal of B while the signal of R becomes almost zero.

In accordance with the present invention as described in the foregoing, the inversion control signal which controls the periodic inversion of the difference signal determined by the color arrangement of the color mosaic filter is used for inversion processing in such a way as to uniformalize the polarity of only a prescribed color signal component of the difference signal. This arrangement of the invention dispenses with the use of the sample hold circuit necessary in conventional devices. This in turn obviates the necessity of timing adjustment for sampling and the adverse effects of the noise resulting from sampling. It is another advantage of the invention that, unlike conventional devices, the present device dispenses with the use of an adder and a substracter.

What is claimed is:

1. A color image sensing device comprising:
   a. image pickup means for converting an optical image into an electrical signal;
   b. a color separation filter disposed in front of the image pickup means, said filter consisting of a plurality of color filters arranged in a given pattern;
   c. a correlation circuit for forming correlative color outputs on the basis of a plurality of different portions of the image pickup means, said correlation circuit being arranged for forming a plurality of color signals each containing predetermined primary color information;
   d. a plurality of polarity inverting means for inverting the polarity of the output of said correlation circuit at predetermined intervals, each inverting means being arranged for inverting the output of the correlation circuit at a different phase; and
   e. signal filter means arranged to cut off the high frequency zone component of the output of said polarity inverting means.

2. A color image sensing device according to claim 1, wherein said image pickup means is a semi-conductor image pickup element.

3. A color image sensing device according to claim 2, wherein said image pickup means is a CCD.

4. A color image sensing device according to claim 1, wherein said color separation filter is composed of color filters of a plurality of different colors arranged into a mosaic pattern.

5. A color image sensing device according to claim 4, wherein said color separation filter is composed of a plurality of different color filters repeatedly arranged in a predetermined sequence.

6. A color image sensing device according to claim 5, wherein said color separation filter is composed of color filters of a plurality of different colors arranged in a matrix shape.

7. A color image sensing device according to claim 1, wherein said plurality of color signals contain a first color signal and a second color signal arranged to be produced respectively in a predetermined cycle.

8. A color image sensing device according to claim 7, wherein said first signal includes information of two primary colors.

9. A color image sensing device according to claim 8, wherein said second signal includes information on at least one of said primary colors included in said first signal.

10. A color image sensing device according to claim 9, wherein said second signal includes the information on the same kinds of primary colors as those of the information of the plurality of primary colors included in said first signal.

11. A color image sensing device according to claim 10, wherein both the first and second signals include information on red and blue.

12. A color image sensing device according to claim 7, wherein the polarity of both the first and second signals is inverted in a predetermined cycle.

13. A color image sensing device according to claim 12, wherein said polarity inversion is effected by polarity inverting means which inverts the output of said correlation circuit in such a way as to make the polarity of the first signal and that of the second signal identical with each other.

14. A color image sensing device according to claim 7, wherein the output of said correlation circuit is arranged alternately to produce the first and second signals.

15. A color image sensing device according to claim 1, wherein said correlation circuit includes delay means which permits comparison of a given horizontal scanning signal produced from said image pickup means with the next horizontal scanning signal.

16. A color image sensing device according to claim 1, wherein said signal filter means is a low pass filter.

17. A color solid state image pickup device comprising:
    (a) a solid state image pickup arrangement including a plurality of picture elements with photoelectric sensitivities, said picture elements forming rows and columns;
    (b) a filter arrangement including a plurality of kinds of color filters, said plurality of kinds of color filters having a prescribed repeating pattern in the column and row directions;
    (c) correlation process means for obtaining correlative color outputs from a plurality of rows of signals;
    (d) a plurality of polarity inverting means for inverting the polarity of the output of said correlation process means at predetermined intervals, each inverting means being arranged for inverting the output of the correlation process means at a different phase; and
    (e) signal filter means arranged to cut off the high frequency zone component of the output of said polarity inverting means.

* * * * *